US011977174B2

(12) United States Patent
Katz

(10) Patent No.: US 11,977,174 B2
(45) Date of Patent: May 7, 2024

(54) BEACON LOCATION ESTIMATION

(71) Applicant: Daniel A. Katz, Kiryat Ono (IL)

(72) Inventor: Daniel A. Katz, Kiryat Ono (IL)

( * ) Notice: Subject to any disclaimer, the term of this patent is extended or adjusted under 35 U.S.C. 154(b) by 116 days.

(21) Appl. No.: 17/380,050

(22) Filed: Jul. 20, 2021

(65) Prior Publication Data

US 2023/0025224 A1 Jan. 26, 2023

(51) Int. Cl.
*G01S 5/02* (2010.01)
*G01S 19/02* (2010.01)
*G01S 19/05* (2010.01)
*G01S 19/07* (2010.01)
*G01S 19/17* (2010.01)

(52) U.S. Cl.
CPC ............ *G01S 5/0231* (2013.01); *G01S 19/02* (2013.01); *G01S 19/05* (2013.01); *G01S 19/071* (2019.08); *G01S 19/17* (2013.01)

(58) Field of Classification Search
CPC ........ G01S 19/17; G01S 5/0231; G01S 19/05; G01S 19/02; G01S 19/071; H04B 7/1851; H04W 4/029
See application file for complete search history.

(56) References Cited

U.S. PATENT DOCUMENTS 5,414,432 A * 5/1995 Penny, Jr. ............... G01S 19/17
342/44
5,748,147 A * 5/1998 Bickley .................. G01S 5/0027
342/357.59
8,554,173 B2 * 10/2013 Hope ...................... G01S 19/17
455/456.6
2011/0122019 A1 * 5/2011 Lee ......................... G01S 5/0231
342/385
2016/0003933 A1 * 1/2016 Calmettes ............... G01S 19/17
342/357.25

FOREIGN PATENT DOCUMENTS

JP 2002008164 A * 1/2002

OTHER PUBLICATIONS

De Miquel, Alejandro et al, "Physiological Monitoring of a Wrist-Worn Personal Locator Beacon User", Sensors & Transducers, vol. 206, Issue 11, Nov. 2016 (Year: 2016).*

* cited by examiner

Primary Examiner — Cassi J Galt

(57) ABSTRACT

A method and system for estimation of the current location of a remote radio beacon, at a mobile device, based on two historical positions thereof provided via at least two satellite relays and one base station, particularly usable for Search and Rescue. A beacon is configured to periodically transmit short RF signals, relayed by a first satellite payload to a base station, at which the position of the beacon is resolved; then, the base station transmits a message, relayed by a second satellite payload and detectable by a mobile device, encoding two previous positions of the beacon, stamped with time tags. Finally, the mobile device decodes the information about said two previous positions of the beacon, and accordingly estimates the current position of the beacon, accounting for possible different time references.

20 Claims, 8 Drawing Sheets

System according to first embodiment

Figure 1 – Present art - Galileo Return Link Service System
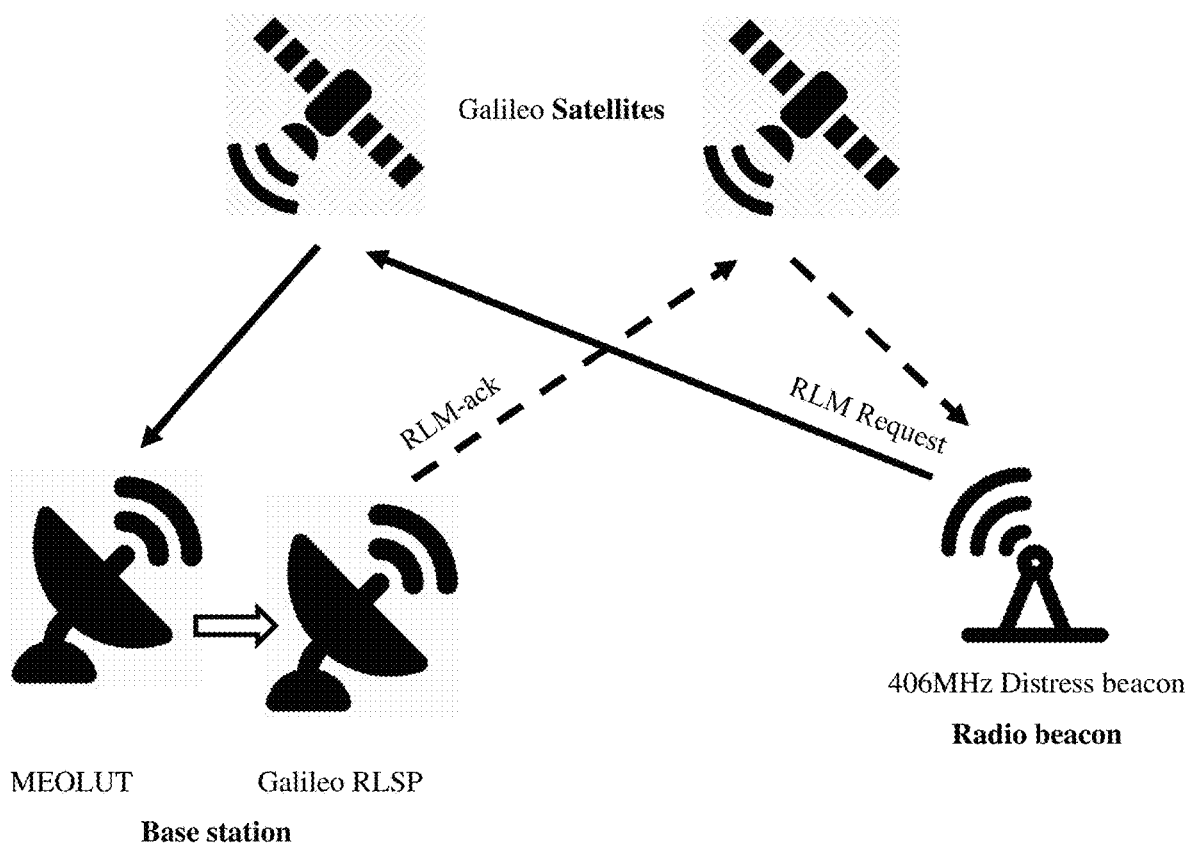

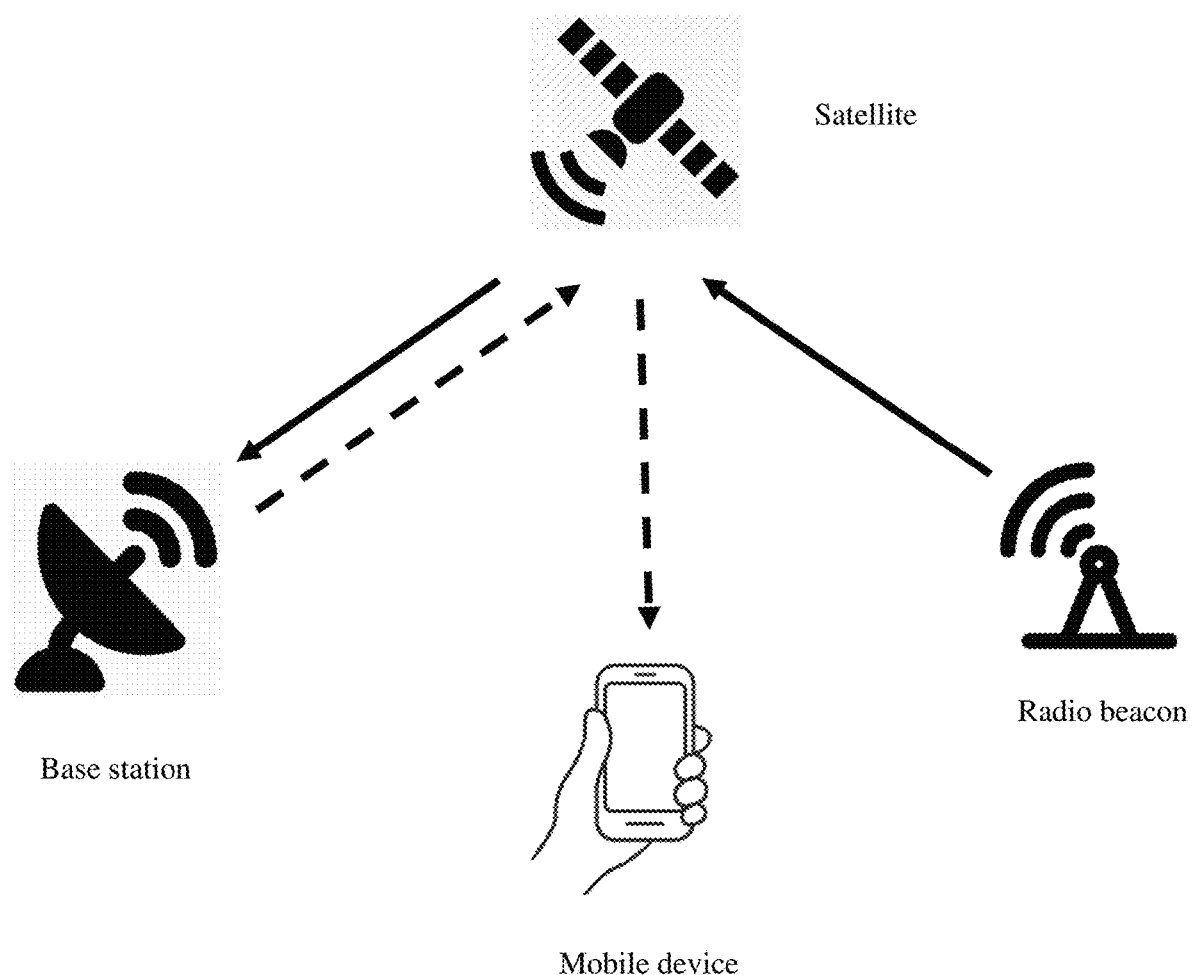
Figure 2 – Basic System according to present invention

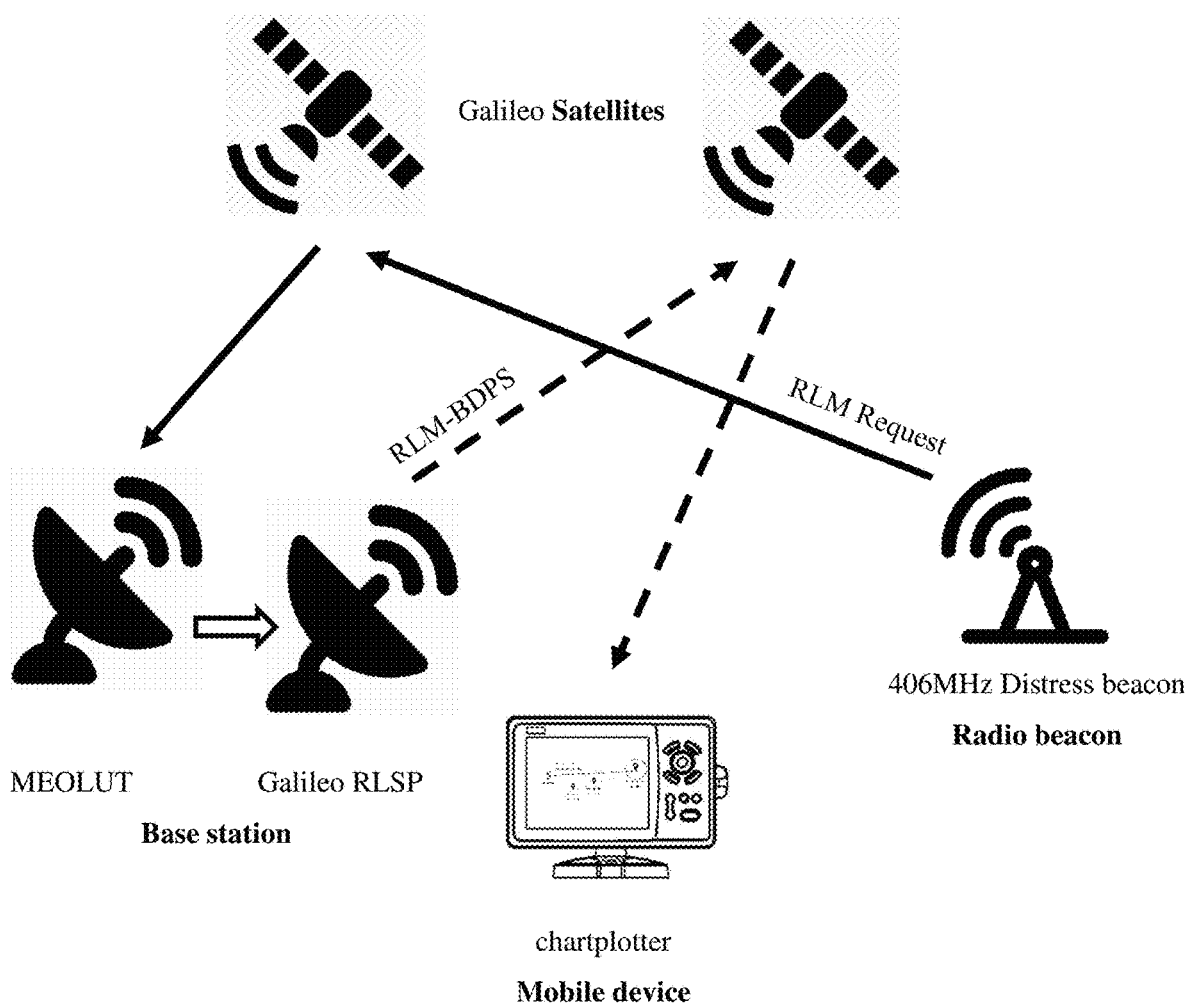
Figure 3 – System according to first embodiment

Figure 4 – Radio beacon block diagram
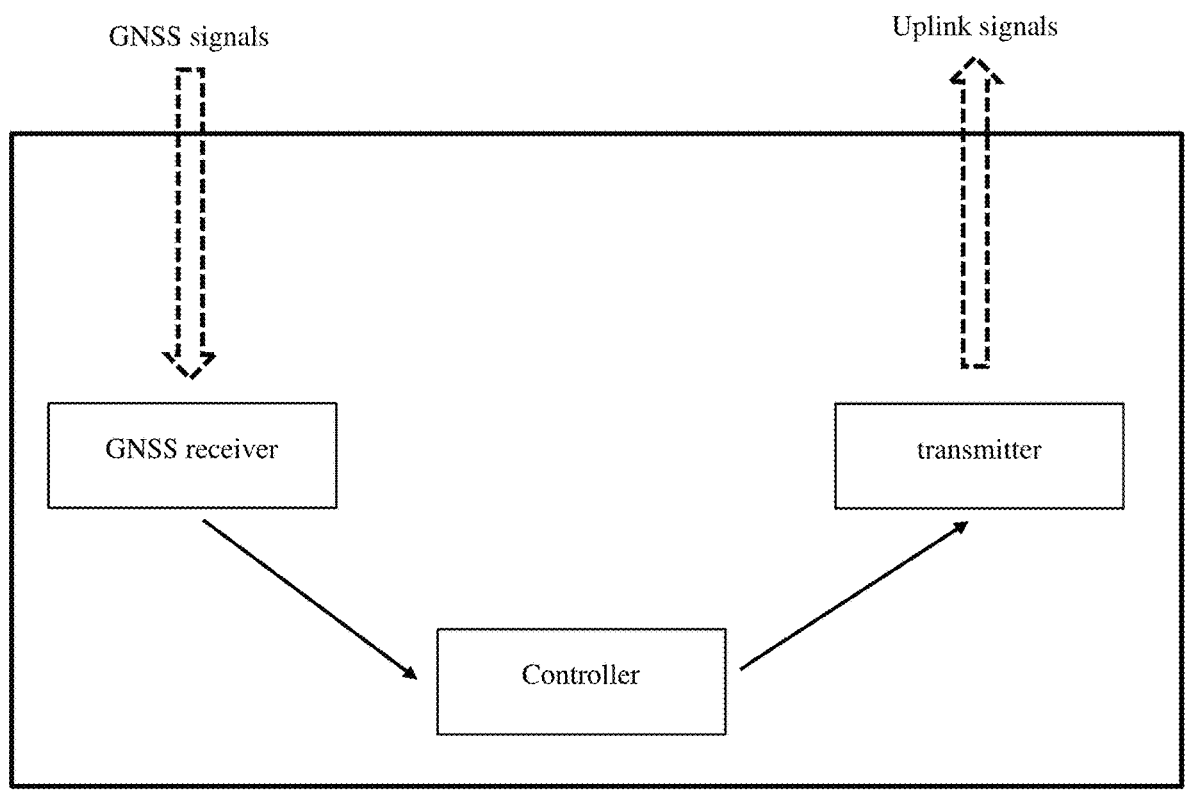

Figure 5 – Mobile device according to first embodiment
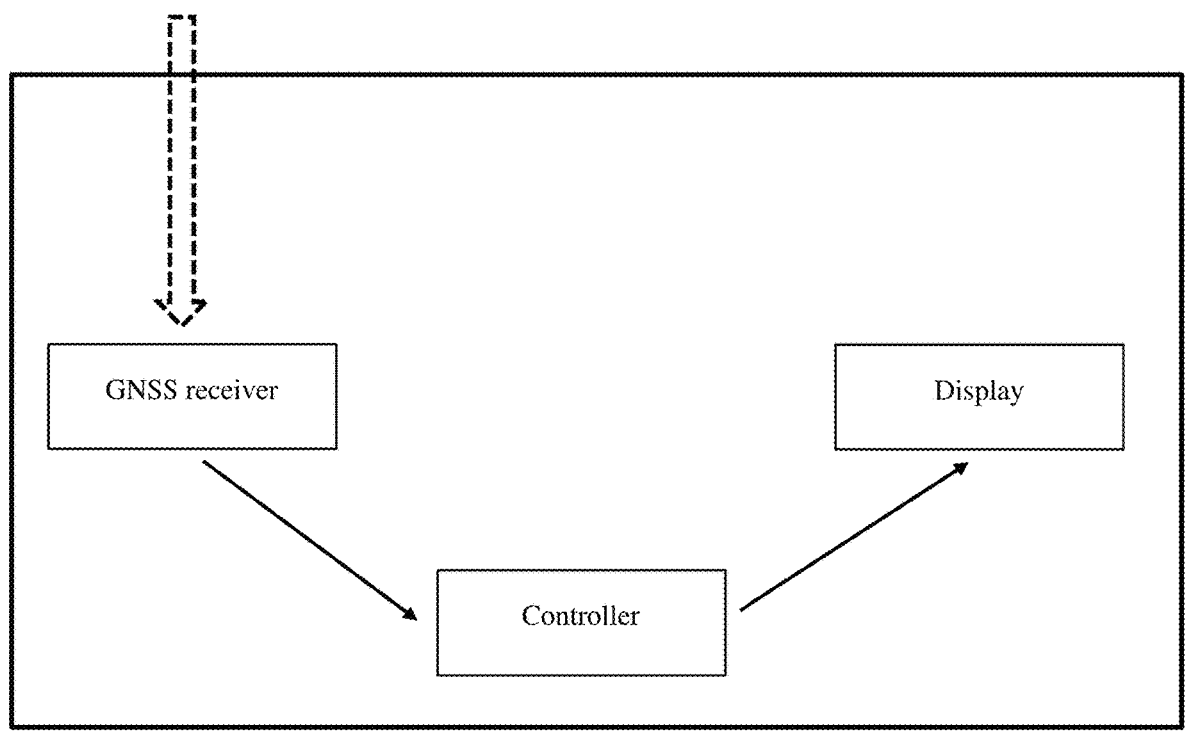

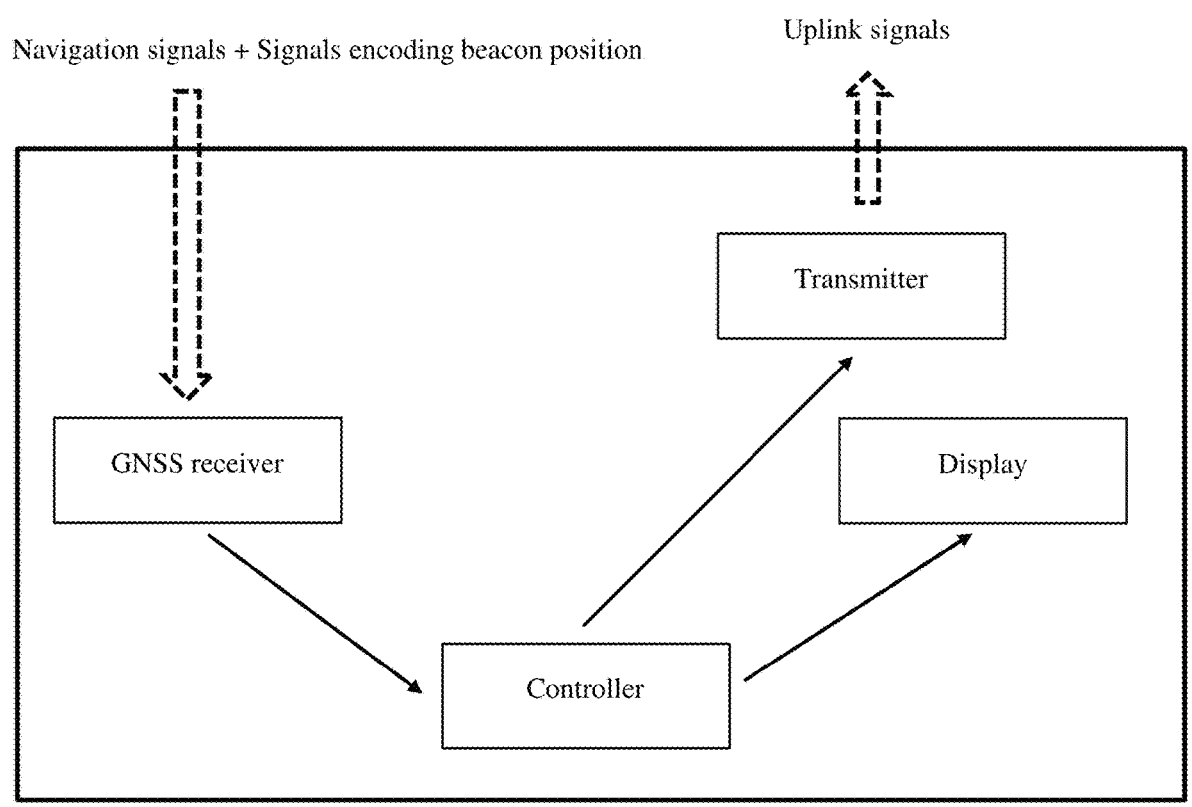
Figure 6 – Mobile device according to second embodiment

Figure 7 – Mobile device display according to first embodiment
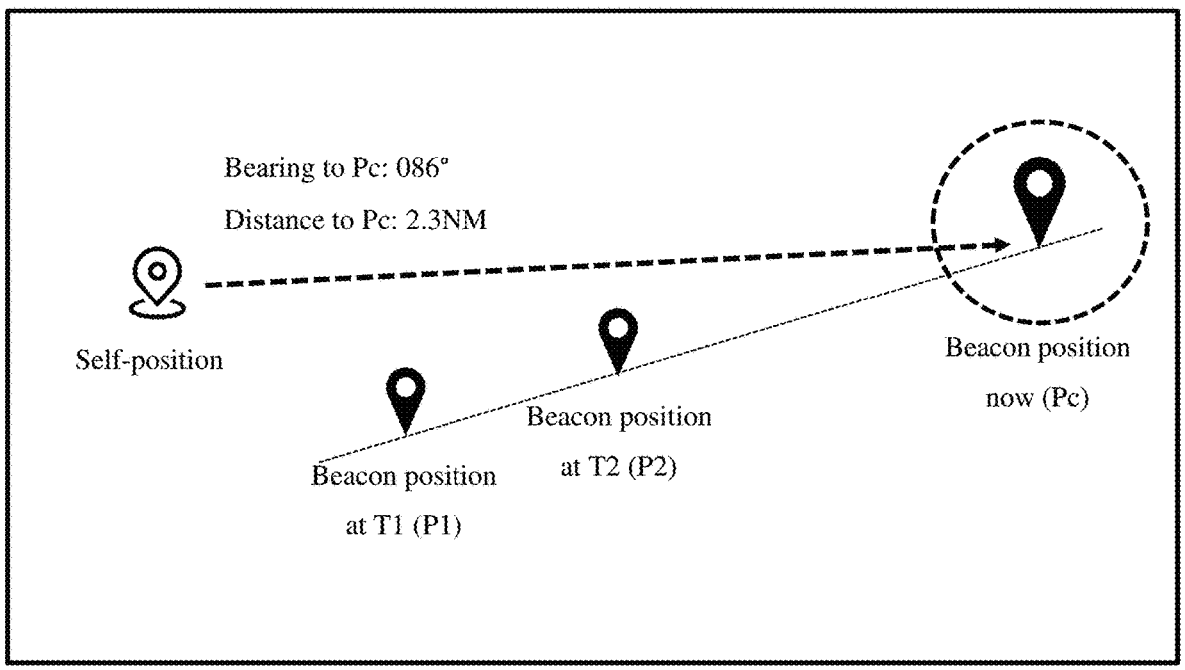

Figure 8 – Communication protocol according to first embodiment

Eight sequential I/NAV Nominal Pages enabling communicating P1, T1, P2, T2 as SAR/RLM data.

| Part (1/8) | | | Part (2/8) | | | Part (3/8) | | | Part (4/8) | | | |
|---|---|---|---|---|---|---|---|---|---|---|---|---|
| Start bit = 1 | Long RLM | SAR RLM data — Beacon ID (1/3) | Start bit = 0 | Long RLM | SAR RLM data — Beacon ID (2/3) | Start bit = 0 | Long RLM | SAR RLM data — Beacon ID (3/3) | Start bit = 0 | Long RLM | SAR RLM data — Message code | Parameters (1/5) |
| 1 | 1 | 20 | 1 | 1 | 20 | 1 | 1 | 20 | 1 | 1 | 4 | 16 |
| 22 | | | 22 | | | 22 | | | 22 | | | |

| Part (5/8) | | | Part (6/8) | | | Part (7/8) | | | Part (8/8) | | |
|---|---|---|---|---|---|---|---|---|---|---|---|
| Start bit = 0 | Long RLM | SAR RLM data — Parameters (2/5) | Start bit = 0 | Long RLM | SAR RLM data — Parameters (3/5) | Start bit = 0 | Long RLM | SAR RLM data — Parameters (4/5) | Start bit = 0 | Long RLM | SAR RLM data — Parameters (5/5) |
| 1 | 1 | 20 | 1 | 1 | 20 | 1 | 1 | 20 | 1 | 1 | 20 |
| 22 | | | 22 | | | 22 | | | 22 | | |

BEACON LOCATION ESTIMATION

BACKGROUND OF THE INVENTION

Determining the location of remote objects, such as people, animals, vehicles and other portable assets, is a wide need, required in a variety of fields and applications, for example: public transportation, command and control of military troops, tracking wild animals, search and rescue, etc.

A practical instrument to assist in determining the location of such objects is a radio beacon, which is a radio frequency (RF) transmitter that can be attached to an object and locatable at compatible receivers. When requiring to determine the location of objects in a wide area, hundreds and thousands of kilometers away from the beacon, relays mounted onboard satellites orbiting around the earth are particularly instrumental in communicating the signal between beacon and tracking receivers.

There are several current art methods to locate radio beacons, particularly employing satellites. In the presence of Global Navigation Satellite Systems (GNSSs), such as the US GPS, the Russian Glonass and the European Galileo, a GNSS receiver can be embedded in a beacon, acquire self-position, and encode its GNSS position in the transmitted signal, which can be decoded by the locating receivers. A typical such system is the Cospas-Sarsat GEOSAR (Geostationary Earth Orbit satellites for Search and Rescue).

Known also are wide area localization methods independent of GNSS, employing satellites, wherein the locating receivers measure the Time of Arrival (TOA), and/or Frequency of Arrival (FOA), of the signal transmitted by the beacon and relayed by one or more satellites, acquire the momentary location of the relaying satellites, and accordingly fix the beacon position. TOA localization is also known as trilateration, and FOA localization is also known as the Doppler method. Typical such systems are the Cospas-Sarsat LEOSAR—Low Earth Orbit satellites for Search and Rescue, and MEOSAR—Medium Earth Orbit satellites for Search and Rescue, and the ARGOS system for tracking of wild animals.

GNSS based localization requires at least four satellites in view to fix a three-dimensional (3D) position, while the MEOSAR with combined TOA and FOA requires three satellites. When assuming a slow-moving beacon, a multi-burst localization can be employed, assuming that several bursts, typically separated in time by a couple of minutes, are associated with a same position of the beacon. in particular, this method is employed by the LEOSAR, using a single satellite at several locations along its quick pass, to determine the beacon location.

U.S. Pat. No. 10,054,663 by Katz, discloses a localization method based on independent TOA assisted by one GNSS satellite signal, enabling localization with as few as 1-2 satellites, altogether.

A particular case of radio beacons detected and tracked with the assistance of satellites is of distress radio beacons, also collectively known as distress beacons, emergency beacons, or simply beacons, operating as part of the international Cospas-Sarsat Search and Rescue satellite system. When activated, these beacons send out a distress signal that, when detected and relayed by satellites, can be located by the system base stations, as well as search parties, who can in turn come to the aid of the concerned boat, aircraft or persons. There are three kinds of distress radio beacons:

EPIRBs (Emergency Position-Indicating Radio Beacons)—signal maritime distress;

ELTs (Emergency Locator Transmitters)—signal aircraft distress;

PLBs (Personal Locator Beacons)—signal a person in distress.

Although EPIRBs, ELTs and PLBs differ in size and form, the signal transmitted thereby is similar: typically, a short (about 0.5 sec) RF burst in the 406 MHz band, modulated by 144 low-rate bits, mainly indicating a unique IDentification number (ID) and optionally encoding the GNSS acquired self-position.

In about 40 years of operation, the Cospas-Sarsat system was instrumental in rescuing more than 50,000 people, in maritime, terrestrial and airborne distress cases.

The basic purpose of distress radio beacons is to rescue people within the so-called "golden time" (the first 24 hours following a traumatic event), when the majority of survivors can still be saved. However, several factors might limit this goal, including communication latency, searching difficulties and problematic access of rescuers to victims, due to a long distance, terrestrial obstacles or weather conditions, to name a few.

Even in the presence of the Cospas-Sarsat SAR system, and considering the establishment and operation of SAR authorities, in many cases of distress, the best chance of a person to be rescued arrives from occasionally nearby people, not necessarily dedicated SAR personnel that might be unalerted or far away to provide a first response. Such potentially ad-hoc rescuers could be peers engaged in same activity as the victim, such as: sailors from same boat/fleet nearby person fallen overboard or abandoning ship; or mountaineers/hikers from same expedition or occasionally at same area at which a peer is in distress.

But in order that such ad-hoc rescuers, as well as professional rescuers or volunteers dispatched by SAR authorities, will act effectively, they should be updated with the actual position of the person in distress, which in many cases is not in eye contact. Presently, this is done in a limited way: the resolved position of the beacon is sent to the nearest Rescue Coordination Center (RCC), and RCC personnel try to access potential rescuers, usually over VHF channel 16 (156.8 MHz), which is designated as an international distress frequency. This of course is limited to the VHF range, depending on the transmitter transmission power, receiver sensitivity and particularly antenna height, but generally less than 50 NM. Similar range limitations are present with SAR assisted with the AIS—Automatic Identification System, which is also VHF based. Another problem with present art is that even if the information about the location of the beacon arrives to the rescuers, it is usually not updated, due to the typically long time of location acquisition, processing, and communication, especially in narrow band satellite communication systems.

Furthermore, presently, such potential rescuers might not be accessible by the Cospas-Sarsat Rescue Coordination Center (RCC) which has the information about the victim location, and is in charge of the SAR operation, since the RCC is not aware of their presence and potential contribution.

A better way to achieve that, assuming that the victim activates a distress beacon, and assuming that the position of that beacon is resolved by base stations, even far away, is to publish or share the resolved position of the beacon (person) in distress among potential rescuers, particularly those in the area at which the distress beacon was activated. Preferably, if published by a satellite system, the coverage area could be practically unlimited.

It is then a major objective of the present invention to provide an efficient method to publish/distribute the position of activated distress beacons among potential rescuers equipped with regular terminals capable of displaying this position, independent of range and terrestrial infrastructure.

Preferably, a communication system to publish beacon position should have worldwide coverage, so practically base on satellite communications. Furthermore, using such an existing system, accessible at billions of mobile devices worldwide, and free of airtime fee charge, is mostly preferable. Actually, there are several, such systems in operational status—Global Navigation Satellite Systems—GNSSs, although not initially designed for that purpose. As well known by the skilled person, GNSS signals are detected by billions of GNSS enabled devises, worldwide, including smartphones, in car terminals, marine chart plotters, smartwatches, and more.

Presently, GNSSs broadcast navigational data, but could possibly broadcast additional data. The major GNSS structure to potentially support transmission of general-purpose data is the navigation message. Every GNSS satellite receives from the ground antennas the navigation data which is sent back to the users through the navigation message. The Navigation Message provides all the necessary information to allow the user to acquire self-position. It includes the Ephemeris parameters, indicating the dynamic position of the satellites, the Time parameters and Clock Corrections, to compute the signal travelling time from satellite to GNSS receiver, the Service Parameters with satellite health information, Ionospheric parameters to correct the travelling time, and the Almanac, indicating the coarse position of the entire constellation of satellites. The ephemeris and clocks parameters are usually updated every two hours, while the almanac is updated at least every six days. The structure and format of Navigation messages vary among different GNSS constellations, and generations, and different signals emitted by single satellite. Still, some of the presently broadcast navigation data could be considered less important, possibly removed or broadcast at a lower repetitive rate or lower resolution, such as the Almanac, which might have been crucial 20 years ago when GNSS receivers obtained a single or dual satellite channel, compared to 32 and more today, allowing tracking all-in-view satellites. Such potential redundant data could be replaced by data encoding the position of distress beacons.

A new service related to SAR, recently launched by the European Commission, is particularly interesting in the context of the present invention—the Return Link Service, which was declared operational in 2020.

As published by EUSPA (formerly GSA— European GNSS Agency), the Galileo Return Link Service (RLS) is a free-of-charge global service available to Cospas-Sarsat RLS compatible beacons. The new functionality, currently offered uniquely by Galileo, enables a communication link that relays Return Link Messages (RLM) back to the originating beacon through the Galileo Navigation Signal in Space (I/NAV E1). By sending a confirmation to the user that the distress signal from the beacon has been localised by the Cospas-Sarsat system and the information relayed to the relevant Search and Rescue governmental authorities, the Return Link Service (RLS) will help save more lives. Receiving reassurance that their distress alert has been well received will deliver a valuable psychological lift to victims and further boost survival rates by reducing panic. The end-to-end RLM delivery time is expected to be about 10 minutes, but in some cases it may take longer, possibly up to 30 minutes from the moment the beacon is activated until the notification is sent via the Galileo Signal in Space. A total of 15 minutes are allocated to the Cospas-Sarsat system for the localisation and routing of the alert and 15 minutes to the Galileo System for the Return Link message broadcast. However, measured results generally achieve a much faster message delivery time.

However, the RLS could also be an effective platform to publish the beacon position among potential rescuers, since RLMs can principally be detected worldwide using a Galileo receiver. For that purpose, a new type of RLM could be defined, call it RLM-BDPS (for Beacon Distress Position Sharing), using the structure of a long RLM, as defined in the EUROPEAN GNSS (GALILEO) OPEN SERVICE, SIGNAL-IN-SPACE INTERFACE CONTROL DOCUMENT (ICD), Issue 2.0, January 2021.

The long RLM, defined in section 4.3.7. SAR Field Structure of said ICD, provides a way to communicate 96 bits, in addition to the beacon ID (60 bits encoding a 15 Hex unique ID), in eight consecutive pages, altogether during 2*8=16 seconds. And again, the end-to-end RLM delivery time is expected to be about 10 minutes, in some cases even 30 minutes from the moment the beacon is activated. So, if the RLS is used to publish a beacon position, a significant latency should be considered. A person fallen overboard in a stormy night could significantly drift in 30 minutes, such that his position 30 minutes ago will be of a limited value to the rescuers.

Another limitation in using the RLS to publish the position of active beacons is the frequency at which a beacon position could be published. Assuming 30 simultaneously active beacons worldwide, a cycle of publishing all these will take 16 s*30=8 minutes.

Therefore, it is another objective of the present invention to provide an efficient method for rescuers to get the updated position of a distress beacon.

In navigation, dead reckoning is the process of calculating current position of some moving object by using a previously determined position, or fix, and then incorporating estimations of speed, heading direction, and course over elapsed time.

U.S. Pat. No. 10,809,388 by Carcanague et al. discloses Systems and methods for high-integrity satellite positioning. Carcanague specifically discloses extrapolation based on prior estimated positions and velocities.

U.S. Pat. No. 10,547,977 by Ramasamy discloses Method and apparatus for crowdsourcing the location of mobile terrestrial transports. Ramasamy specifically discloses server 250 determines the location of the mobile terrestrial transport 281 by extrapolating based upon uploaded location and time information and velocity estimates . . . server 250 may also consider historical time, location and speed data in estimating the location of mobile terrestrial transport 281.

Yet Carcanague discloses dead reckoning at a receiver which position is estimated, failing to consider dead reckoning of the position of a remote device, and both Carcanague and Ramasamy disclose dead reckoning wherein the time tags of historical positions are according to the system clock reference, failing to consider different clocks.

Thus, it is also another objective of the present invention to use historical records of position and time tags related to a remote beacon, and accordingly remotely extrapolate the current position thereof, accounting for the different clock (time reference) by which the historical time tags were stamped, vs. the clock at which the current time is measured.

Yet, the process of extrapolation of the location of a remote moving beacon, particularly far distant, requires special consideration of data communication, to cope with communication capacity and latency typical to satellite systems. For example, the presently 96 bits available in the Galileo long RLM provide a limited platform to standardly encode the movement of a beacon, dynamically and accurately.

So, it is still another objective of the present invention to define and encode the historical position and time records of a beacon to be remotely localized, coping with the limitations of satellite links, particularly low throughput and latency in communicating information.

SUMMARY OF THE INVENTION

The present invention discloses a method for estimating the current location of a remote radio beacon, at a mobile device, using at least two satellite relays and one base station, comprising the steps of:
a. Configuring the radio beacon to periodically transmit RF signals;
b. Configuring a first satellite payload to relay signals between beacon and base station;
c. Configuring the base station to detect relayed beacon signals, and accordingly determine a first position (P1) at which the beacon was at a first time (T1), and a second position (P2) at which the beacon was at a second time (T2), and transmit information encoding P1, T1, P2 and T2.
d. Configuring a second satellite payload to relay signals between base station and mobile device;
e. Configuring the mobile device to detect relayed base station signals, decode P1, T1, P2, and T2, and determine the beacon position (Pc) at current time (Tc) based on P1, P2, T1, T2 and Tc, adjusting Tc according to the time reference at which T1 and T2 are expressed.

Preferably, T1, T2 and Tc are all expressed in UTC (Universal Time Coordinated).

Preferably, T1 and T2 are selected from a pre-defined set of discrete values.

Such pre-defined set of permitted values are typically separated evenly from each other, so practically provide a coarse resolution scale, enabling using less bits for encoding so better suitable for narrowband communications, as is often the case with long range satellite connectivity. Nevertheless, this approach does not necessarily degrade the accuracy of the time tag. For example, the pre-defined set of values for the time tags could be defined in integer multiples of 10 seconds, such that the least significant bit of the time tag will represent 10 seconds, still the time tag accuracy could be much better, for example 1 second, such that if the encoded time tag is hh:mm:20 s, then the real value is hh:mm:20 s+/−1 sec.

For example, at the base station, T1 and T2 could be chosen as close as possible to an exact UTC minute, i.e. with zero UTC seconds, and encoded at one minute resolution, what will save encoding bits but still provide good accuracy. For example, T1 and T2 could be encoded in Time of Week (TOW) minutes, and since there are 7*24*60=10,080 minutes per week, 14 bits are required per such time tag.

Possibly, at least one of: the information about P2 is encoded as the difference from P1 (Pd), or the information about T2 is encoded as the difference from T1 (Td).

This may further compact the encoding of P1, P2, T1 and T2, in less bits. For example, T1 and T2 could be expressed in TOW-minutes, encoding T1 with 14 bits, then define T2=T1+Td, and assuming that Td is less than 24 hours, accounting for 24*60=1440 minutes per day, encode Td with 11 bits.

Also Pd could be defined, as: P2=P1+Pd, and since P1 and P2 typically encode coordinates of nearby locations, Pd could be expressed in fewer bits than P2. For example, according to the Cospas-Sarsat Standard Location Protocol (SLP), a GNSS encoded position of a beacon takes 37 bits, expressing the latitude and longitude coordinates at a resolution of ×4 seconds of an arc, i.e. up to about 125 m error. Assuming that the distance between P1 and P2 is less than 60 NM (Nautical Miles) to the North/South, and less than 60 NM to the East/West, i.e. less than 1 degree in LAT and less than 1 degree in LON, Pd could be encoded in 22 bits, at ×4 sec resolution, including a North/South bit and East/West bit, since there are 900=15*60 steps of ×4 sec in 1 deg.

Possibly, at the base station, P1 is determined based on a multitude of signals arriving approximately at T1, and P2 is determined based on a multitude of signals arriving approximately at T2, wherein T2 and T1 are relatively separated in time.

For example, P1 may be determined at base station based on Time of Arrival (TOA) or Frequency of Arrival (FOA) of a signal originating from the beacon and relayed by several satellites, then each relayed signal arrives at a different time to the base station, since the distance: [beacon to satellite]+ [satellite to base station] is different for each satellite, however these differences are typically in scale of milliseconds or tens of milliseconds, so a consolidated time tag, T1, may be stamped in association with P1.

Also, if the radio beacon incorporates a GNSS receiver, the beacon signal may be modulated with its GNSS encoded position, such that the base station could easily decode. Then, if the beacon reports the time of acquiring its GNSS position, the base station could accept that as the time tag T1 or T2, otherwise the time at which the base station decoded the GNSS encoded position could be used as T1/T2, what obviously introduces some error, in case of a moving beacon.

At the mobile device, Pc is determined on a line with P1 and P2, and the distance between Pc and P2 is set to: (Pc−P2)=(P2−P1)*(Tc−T2)/(T2−T1). This is a simple expression of linear extrapolation, using the historical average velocity between P1 and P2: (P2−P1)/(T2−T1), and direction of movement: on same line, to predict the current position Pc; kind of remote dead reckoning through satellite.

Since P1 and P2 express historical positions, some kind of extrapolation is needed to assess the current position of the remote beacon. One simple way is a linear extrapolation, assuming that the velocity and direction made while moving from P1 to P2, at T2−T1 time, is still valid for the movement from P2 to the current position Pc. After receiving several sets of previous positions of the beacon with time tags, the mobile device may use other ways to assess the current position, based on more than two previous positions; for example, consider the average velocity and mean direction of the entire movement of the beacon, and accordingly extrapolate the location.

Further, at the mobile device, a self-position is preferably determined, then the bearing and distance to the assessed position of the beacon is displayed. Such display, periodically been updated, could be instrumental in navigating the mobile device user to the remote radio beacon.

The satellite first payload and the satellite second payload could be the same, or mounted onboard same satellite, i.e. same satellite may relay the signal from beacon to bases station, and from base station to mobile device. In particular, medium orbit satellites, such as GNSS satellites, are in a good position to take both such relays onboard, providing a significant footprint on earth, enabling relaying beacons and mobile devices been thousands of kilometers away from each other. Usually, the transmission frequency of the beacon, e.g. in the UHF band, is different from the receiving frequency of the base station, e.g. in L-band, and the transmission frequency of the base station different from the receiving frequency of the mobile device—L-band GNSS, so the relay could also up-convert or down-convert the frequency.

Preferably, the second payload, relaying the signal from base station to mobile device, is a navigation payload, and the information about P1, T1, P2 and T2 is encoded in the downlink navigation message.

This provides two main advantages: a) easy implementation of the mobile device receiver, actually based on a GNSS receiver, typically coupled with an internal antenna; and b) worldwide coverage.

In particular, the information about P1, T1, P2 and T2 may be encoded in a Galileo Return Link Message, which is part of the Galileo navigation message.

The present invention discloses also a mobile device for estimating the current location of a remote radio beacon, comprising: a) a receiver; b) a controller; and c) a display; said device configured to detect and decode data embedded in satellite downstream signals, indicating a first position (P1) at which the beacon was at a first time (T1), and a second position (P2) at which the beacon was at a second time (T2), further acquire the current time (Tc), then determine and display the current position of the beacon (Pc) based on P1, P2, T1, T2 and Tc, adjusting Tc according to the time reference at which T1 and T2 are expressed.

Further, said device configured to determine Pc on a line with P1 and P2, such that the distance between Pc and P2 is: $(Pc-P2)=(P2-P1)*(Tc-T2)/(T2-T1)$.

Further, the base station is configured to determine, encode and transmit an estimation of the error (Er) of P1 and P2. For example, allocate 4 bits to encode the estimated error in multiples of 100 m, starting from 100 m: 100 m, 200 m, . . . , 3,200 m.

Further, said device configured to determine its self-position, and display bearing and distance from its self-position to Pc. Preferably, the Pc estimated error is displayed as well, based on the communicated error estimation Er.

Preferably, at said device, the receiver is a GMSS receiver configured to decode P1, P2, T1 and T2 encoded in the GNSS navigation message.

Preferably, at said device, the GNSS receiver is Galileo enabled, configured to decode P1, P2, T1 and T2 encoded in Galileo Return Link Messages (RLM).

Possibly, the mobile device may integrate a radio beacon. Typically, such integrated instrument could provide a dual function: a) radio beacon, possibly distress beacon; b) localization of other beacons. Such compact double function instrument could serve, for example, mountaineers, which need both functions and are keen to reduce the weight they carry with them.

The present invention discloses also a computer non-transitory readable storage medium storing a program for a mobile device to estimate the current location of a remote radio beacon, the computer program comprising a set of instructions for causing the device to perform the steps of:
a. decoding data transmitted in downstream GNSS signals, indicating a first position (P1) at which the beacon was at a first time (T1), and a second position (P2) at which the beacon was at a second time (T2);
b. acquiring the current time;
c. determining and displaying the beacon position (Pc) at current time (Tc) based on P1, P2, T1, T2 and Tc, adjusting Tc according to the time reference at which T1 and T2 are expressed.

Further, the computer storage medium storing a program comprises instructions causing the device to determine Pc on a line with P1 and P2, such that the distance between Pc and P2 is: $(Pc-P2)=(P2-P1)*(Tc-T2)/(T2-T1)$.

Further, the computer storage medium storing a program comprising instructions causing the device to acquire self-position, determine and display distance and bearing from self-position to Pc.

Other objects and advantages of the invention will become apparent as the description proceeds.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein:

FIG. 1 illustrates the present Galileo Return Link Service System. Two Galileo MEO satellites are depicted at the top of the picture, a radio beacon at the bottom-right and a base station at bottom-left depicted with two parabolic satellite antennas. The top-left satellite is shown to relay a signal, depicted by a continuous line, between the radio beacon, transmitting a 406 MHz RLM request, to the left antenna at base station, which is a Medium Earth Orbit Local User Terminal (MEOLUT) that resolves the beacon position. At the base station, an arrow illustrates that the left antenna—MEOLUT reports the beacon position information to the right antenna—Galileo RLSP—Return Link Service Provider. Another signal, illustrated by a dashed line, representing the RLM-ack message sent from the RLSP, relayed by the top-right satellite and reaching the radio beacon.

FIG. 2 illustrates a Basic System according to the present invention. A satellite, at the top of the picture, is depicted to relay a signal, illustrated by a continuous line, between a radio beacon and a base station, where the beacon position is resolved. Another signal, illustrated by a dashed line, reporting the beacon historical positions, is depicted to be relayed by the satellite between the base station and a mobile device.

FIG. 3 illustrates a System according to a first embodiment of the present invention. Two Galileo MEO satellites are depicted at the top of the picture, a radio beacon at the bottom-right part, a mobile device at the bottom-center and a base station at bottom-left depicted with two parabolic satellite antennas. The top-left satellite is depicted to relay a signal, illustrated by a continuous line, between radio beacon, transmitting a 406 MHz RLM request, to the left antenna at base station, which according to the first embodiment is a Medium Earth Orbit Local User Terminal (MEOLUT) that resolves the beacon position. At base station, an arrow illustrates that the left antenna—MEOLUT reports the beacon position information to the right antenna—Galileo RLSP—Return Link Service Provider. Another signal, illustrated by a dashed line, carrying the proposed RLM-BDPS message, is depicted to be relayed by the top-right satellite between the RLSP at the base station and a mobile device, the latter in form of a chartplotter. According to the first embodiment, the RLM-BDPS encodes the beacon historical positions.

FIG. 4 illustrates a block diagram of a Radio beacon. Three blocks are shown: A GNSS receiver, capable of receiving navigation signals from GNSS satellites; a controller; and a transmitter; wherein the controller is coupled to the GNSS receiver and to the transmitter.

FIG. 5 illustrates a block diagram of a Mobile device according to a first embodiment of the present invention. Three blocks are shown: A GNSS receiver, capable of receiving navigation signals in addition to signals encoding the position of the beacon; a controller; and a display; wherein the controller is coupled to the GNSS receiver and to the display.

FIG. 6 illustrates a block diagram of a Mobile device according to a second embodiment of the present invention. Four blocks are shown: A GNSS receiver, capable of receiving navigation signals encoding position of other beacons; a transmitter capable of generating uplink signals; a controller; and a display; wherein the controller is coupled to the GNSS receiver, to the transmitter and to the display.

FIG. 7 illustrates a Mobile device display according to a first embodiment of the present invention. Specific icons show the current self-position of the mobile device, two previous positions of the beacon: P1 and P2, and the assessed current position of the beacon: Pc, wherein P1, P2 and Pc are on a straight line. In addition, the calculated bearing and distance between the mobile device and the assessed current position of the beacon (Pc) are indicated. A circle around Pc indicates the error estimation.

FIG. 8 illustrates a communication protocol according to a first embodiment of the invention.

The table is extracted from:
EUROPEAN GNSS (GALILEO) OPEN SERVICE
SIGNAL-IN-SPACE INTERFACE CONTROL DOCUMENT (ICD), Issue 2.0, January 2021 According to this EUROPEAN GNSS service, a continuous stream of data is broadcast by Galileo satellites, segmented to nominal I/NAV pages each 2 seconds long, within which a field of 22 bits is allocated for SAR (Search and Rescue) data. According to a first embodiment of the invention, the content of P1, T1, P2, and T2 is encoded in a long RLM, inserted in 8 sequential pages, transmitted during 16 seconds. Using the long RLM format, as specified in the ICD, 60 bits are allocated to encode a unique beacon ID, and 96 bits are left to encode P1, T1, P2 and T2.

DETAILED DESCRIPTION

The above and following examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

The present invention discloses a method for estimating the current location of a remote radio beacon, at a mobile device, using at least two satellite relays and one base station, comprising the steps of:
a. Configuring the radio beacon to periodically transmit RF signals;
b. Configuring a first satellite payload to relay signals between beacon and base station;
c. Configuring the base station to detect relayed beacon signals, and accordingly determine a first position (P1) at which the beacon was at a first time (T1), and a second position (P2) at which the beacon was at a second time (T2), and transmit information encoding P1, T1, P2 and T2.
d. Configuring a second satellite payload to relay signals between base station and mobile device;
e. Configuring the mobile device to detect relayed base station signals, decode P1, T1, P2, and T2, and determine the beacon position (Pc) at current time (Tc) based on P1, P2, T1, T2 and Tc, adjusting Tc according to the time reference at which T1 and T2 are expressed.

Preferably, T1, T2 and Tc are all expressed in UTC (Universal Time Coordinated).

Preferably, T1 and T2 are selected from a pre-defined set of discrete values.

Possibly, at least one of: the information about P2 is encoded as the difference (delta) from P1 (Pd), or the information about T2 is encoded as the difference (delta) from T1 (Td).

Possibly, at the base station, P1 is determined based on a multitude of signals arriving approximately at T1, and P2 is determined based on a multitude of signals arriving approximately at T2, wherein T2 and T1 are relatively separated in time.

According to a first embodiment of the present invention, the radio beacon is a standard Cospas-Sarsat distress beacon, employing the RLS protocol, configured to transmit periodic RF signals at 406 MHz, encoded with an RLM request message. GNSS satellites relay the beacon signals to a base station—a MEOLUT (Medium Earth Orbit Local User Terminal), at which the beacon position is resolved. The beacon positions as resolved (determined) at the MEOLUT are sent to a Mission Control Centre (MCC), and information about bursts encoded with an RLM request is further sent to the Return Link Service Provider (RLSP). At this stage, in the standard SAR/Galileo system, the RLSP generates an RLM-ack, to be relayed by Galileo satellites and detected by the beacon that transmitted the RLM request. At this stage, according to the first embodiment of the present invention, the standard RLM-ack may still be broadcast, yet a new type of RLM is generated and broadcast by Galileo satellites, with or without the standard RLM-ack. The new RLM, named RLM-BDPS (Return Link Message—Beacon Distress Position Sharing) could be generated at any part of base station: MEOLUT or MCC or RLSP, then transmitted, relayed by Galileo satellites, and finally detected by the mobile device. Preferably, said RLM-BDPS is embedded in the Galileo navigation message, so conveniently detected and decoded by a Galileo GNSS receiver embedded in the mobile device.

FIG. 3 illustrates a System according to a first embodiment of the present invention. Two Galileo satellites are depicted at the top of the picture, a radio beacon at the bottom-right part, a mobile device at the bottom-center and a base station at bottom-left depicted with two parabolic satellite antennas. The top-left satellite is depicted to relay the RLM-Request signal from the radio beacon to the MEOLUT, at which the beacon position is resolved, then at the ground the MEOLUT reports the beacon position to the Galileo RLSP, which in turn transmits the RLM-BDPS, which is relayed by Galileo satellites to the mobile device, the latter in form of a chartplotter which is typically installed onboard ships.

As a skilled person may appreciate, the structure of the system illustrated in FIG. 3—first embodiment of present invention, resembles the structure of the system illustrated in FIG. 1—present Galileo RLS system, just that the first embodiment newly discloses: a topology with an additional device—mobile device, and a transmitted message— RLM-BDPS.

At the present Galileo RLS system, the MEOLUT repeatedly resolves the beacon position, adding a time tag to each resolved position, and RLS beacons are reported to the RLSP, perhaps via MCC and/or other network nodes and paths that are indifferent to the present invention.

According to the first embodiment of the present invention, RLS beacons are still reported to the RLSP, but additionally the resolved position and matching time tag of RLS beacons are further sorted, at the MEOLUT or RLSP or at any other part of the RLS terrestrial system segment. The purpose of this sorting is to identify a pair of resolved positions, say P1 and P2, preferably at about 1 NM to 10 NM from each other, and preferably wherein the matching time tags of P1 and P2: T1 and T2, are each substantially close to a round minute. The lower limit of 1 NM is set to filter out too nearby positions where the positioning error could significantly influence the calculated distance and direction between P1 and P2, and the upper limit is set to lower the latency in the process of determining the current position of the beacon, at the mobile device, based on historical position records; however, as a skilled person may appreciate, these are just indicative limits which could be configured differently accounting for other parameters or circumstances, such as type of beacon: PLB (personal)/EPIRB (marine)/ELT (airborne), actual velocity of beacon, localization error (typically lower than 0.1 NM when a GNSS encoded position is present), weather conditions, etc. For example, assuming that the last 10 position records determined at the MEOLUT with respect to a specific RLS beacon where 1 NM-10 NM apart from each other, and that the corresponding time tags were: h1:m1:13 s, h2:m2:55 s, h3:m3:24 s, h4:m4:02 s, h5:m5:33 s, h6:m6:31 s, h7:m7:14 s, h8:m8:01 s, h9:m9:41 s, h10:m10:49 s, then set T1=h4:m4 and T2=h8:m8, wherein P1 is the resolved position of the RLS beacon associated with T1 and P2 is the resolved position of same RLS beacon associated with T2, assuming 1 NM<[P2−P1]<10 NM.

The above time tags are in UTC (Universal Time Coordinated), and the format h1:m1:13 s encodes an hour h1 (00-23), minute m1 (00-59) and 13 seconds (generally 00-59). Tc is also expressed in UTC.

Further, according to a first embodiment of the present invention, P2 is encoded as (P1+Pd), in order to generate a more compact RLM-BDPS. Preferably, P1 is encoded with 37 bits, according to the Cospas-Sarsat RLS Location Protocol, defined in the Cospas-Sarsat Specifications: C/S T.001—Issue 4—Rev. 7 Mar. 2021, section A3.3.7 RLS Location Protocol (also in Figure A10, page A-35). Then, assuming that P1 and P2 are less than 1 degree apart in North-South direction (60 NM), and less than 1 degree apart in East-West direction, Pd is encoded in 22 bits, from which 11 bits encode the Latitude difference and another 11 bits encode the Longitude difference, both at ×4 sec resolution (better than 125 m), including a bit to indicate if P2 is northern or southern to P1, and a bit to indicate if P2 is western or eastern to P1, since 10 bits can encode 900=15*60 steps of ×4 sec, i.e. up to 1 degree in LAT and 1 deg in LON.

Further, according to a first embodiment of the present invention, T2 is encoded as (T1+Td), in order to generate a more compact RLM-BDPS. Preferably, the dynamic range of T1 is one week, and resolution is 1 minute, and since there are 10,080=7*24*60 minutes per week, T1 is encoded with 14 bits. Then, assuming that T1 and T2 are less than 24 hours apart, Td is encoded in 11 bits, at 1 minute resolution, since there are 1,440=24*60 minutes per day.

Further, according to a first embodiment of the present invention, the base station is configured to determine, encode and transmit an estimator of the error (Er) of P1 and P2. The estimated error is encoded in 4 bits, in 100 m steps, wherein 0000 encodes 100 m, 0001 encodes 200 m, 0010 encodes 300 m, and so on, until 1111 encoding 3,200 m. There are several ways by which the position error could be estimated at the base station, such as considering if the localization was made based on a GNSS encoded position reported by the beacon or independently determined at the base station, the number of satellites in view assisting in determining the localization, the velocity of the beacon, and so on, yet these specific methods are out of the scope of the present invention.

Hence, according to the first embodiment of the present invention, P1, Pd, T1, and Td are encoded with 84=37+22+14+11 bits, with a resolution of 4 seconds of arc (better than 125 m) in position, and 1 minute in time. Four more bits are allocated to encode the error estimator (Er), so totally 88 bits are used.

With the present Cospas-Sarsat SAR system, and particularly SAR/Galileo, there is no reason to improve the resolution of the communicated parameters P1, P2, T1 and T2 (as well as Pd and Td of course) in the context of the present invention, since the accuracy thereof is typically not better than the resolution chosen for the first embodiment. In particular, when the MEOLUT determines a position of a beacon according to its GNSS encoded position, this position might be not updated since a beacon might encode an old GNSS position, acquired 5 or even 15 minutes ago, according to the specifications. Nevertheless, as the system evolves, for example specifying a dynamically reporting ELT(DT) beacon, or migrating to a second-generation beacon, the encoding of P1, P2, T1 and T2 according to the present invention could be adopted thereto. Actually, the first embodiment uses only 84+4 bits out of the free 96 bits per long RLM. The rest free bits could be further allocated to communicate information useful for the rescue, such as weather hazards, potential danger by the distress area, or information about the person in distress, possibly acquired online or from data bases recording the beacon holder details.

Back to the first embodiment of the present invention, the information about P1, T1, P2 and T2 is encoded in the downstream navigation signals of Galileo satellites, specifically in the fields allocated to SAR. FIG. 8 illustrates a communication protocol according to a first embodiment of the invention, based on the present format of the Galileo navigation message, as defined in the system ICD:

EUROPEAN GNSS (GALILEO) OPEN SERVICE
SIGNAL-IN-SPACE INTERFACE CONTROL DOCUMENT (ICD), Issue 2.0, January 2021.

According to this ICD, the navigation information is broadcast in I/NAV pages each 2 seconds long, and in each such page 22 bits are allocated for SAR (Search and Rescue) data. A general type of long RLM is defined using 8 consecutive I/NAV pages, i.e. 16 seconds long, at which a specific beacon ID is defined using 60 bits (=20+20+20), and 96 bits (=16+20+20+20+20) are left free. According to the first embodiment of the present invention, 84 bits, out of these 96 bits are allocated to encode P1, Pd (=P2−P1), T1 and Td (=T2−T1), and 4 additional bits encode the position error estimation.

At the mobile device, the present position of the beacon (Pc) is determined on a line with the historical positions P1 and P2, while the distance between Pc and P2 is set to: (Pc−P2)=(P2−P1)*(Tc−T2)/(T2−T1). This is a linear extrapolation, using the calculated historical velocity of (P2−P1)/(T2−T1), and the same direction of movement, as known from the reported historical records, to assess the present position. Once receiving further reports of position of the beacon along with time tags, the mobile device may use the last pair of reported positions, as disclosed here, or extrapolate Pc based on more than just a pair of historical values. Furthermore, at the mobile device, additional inputs could be considered in calculating Pc, such as weather conditions, particularly recent changes in the force and direction of wind and water streaming, or terrain, for example obstacles crossing the ongoing line on which P1 and P2 are placed.

Further, at the mobile device, a self-position is preferably determined, then the bearing and distance to the assessed current position (Pc) of the beacon is displayed. Such display, periodically been updated, could be instrumental in navigating the mobile device user to the remote radio beacon. Preferably, the error estimation is indicated as a circle around Pc, with accordingly radius.

FIG. 7 illustrates a Mobile device display according to a first embodiment of the present invention. Specific icons show the current self-position of the mobile device, two previous positions of the beacon: P1 and P2, and the assessed current position of the beacon (Pc), wherein P1, P2 and Pc are on a straight line. In addition, the calculated bearing and distance between the mobile device and the assessed current position of the beacon (Pc) are indicated. A circle around Pc indicates the error estimation based on the communicated parameter Er. According to the first embodiment, this display is part of a chartplotter, mounted onboard a craft, guiding the craft navigator to access the radio beacon, presumably held by a person in distress, either at sea or on land. Particularly, this scenario is relevant to a person fallen overboard, or abandoning ship into a life raft, activating a distress beacon and searched for by a ship onboard which said chartplotter is installed and said display is present. In such a case, the first embodiment of the present invention could be instrumental no matter how distant is the searching party from the person in distress, due to the practically unlimited (3000 NM and more) MEO satellite coverage.

The present invention discloses also a mobile device for estimating the current location of a remote radio beacon, comprising: a) a receiver; b) a controller; and c) a display; said device configured to detect and decode data embedded in satellite downstream signals, indicating a first position (P1) at which the beacon was at a first time (T1), and a second position (P2) at which the beacon was at a second time (T2), further acquire the current time (Tc), then determine and display the current position of the beacon (Pc) based on P1, P2, T1, T2 and Tc, adjusting Tc according to the time reference at which T1 and T2 are expressed.

Preferably, at said device, the receiver is a GNSS receiver configured to decode P1, P2, T1 and T2 encoded in the GNSS navigation message; particularly, said GNSS receiver is an EGNSS receiver, i.e. Galileo enabled, configured to decode P1, P2, T1 and T2 encoded in Galileo Return Link Messages (RLM).

FIG. 5 illustrates a block diagram of a Mobile device according to a first embodiment of the present invention. Three blocks are shown: A GNSS receiver, capable of receiving navigation signals in addition to signals encoding P1, P2, T1 and T2; a controller; and a display; wherein the controller is coupled to the GNSS receiver and to the display.

Further, said device configured to determine Pc on a line with P1 and P2, such that the distance between Pc and P2 is set to: (Pc−P2)=(P2−P1)*(Tc−T2)/(T2−T1).

Further, said device is configured to determine its self-position, and display bearing and distance from its self-position to Pc, as illustrated in FIG. 7—Mobile device display according to first embodiment.

Possibly, the mobile device may integrate a radio beacon. Typically, such integrated instrument could provide a dual function: a) radio beacon, possibly distress beacon; b) localization of other beacons. Such compact double function instrument could serve, for example, a group of mountaineers or participants in a long-distance sailing regatta, or desert race, which could potentially be either in distress or rescuers of peers in distress.

According to a second embodiment of the present invention, the mobile device is a smart phone, or smart watch, embedded with an EGNSS receiver, and capable also to transmit distress signals. FIG. 6 illustrates a block diagram of such Mobile device according to a second embodiment of the present invention. Four blocks are shown: A GNSS receiver, capable of receiving navigation signals; a transmitter capable of generating uplink signals; a controller; and a display; wherein the controller is coupled to the GNSS receiver, to the transmitter and to the display.

The present invention discloses also a computer non-transitory readable storage medium storing a program for a mobile device to estimate the current location of a remote radio beacon, the computer program comprising a set of instructions for causing the device to perform the steps of:
a. decoding data transmitted in downstream GNSS signals, indicating a first position (P1) at which the beacon was at a first time (T1), and a second position (P2) at which the beacon was at a second time (T2);
b. acquiring the current time;
c. determining and displaying the beacon position (Pc) at current time (Tc) based on P1, P2, T1, T2 and Tc, adjusting Tc according to the time reference at which T1 and T2 are expressed.

Further, the computer storage medium storing a program comprises instructions causing the device to determine Pc on a line with P1 and P2, such that the distance between Pc and P2 is: (Pc−P2)=(P2−P1)*(Tc−T2)/(T2−T1).

Further, the computer storage medium storing a program comprising instructions causing the device to acquire self-position, determine and display distance and bearing from self-position to Pc.

The true scope the present invention is not limited to the currently preferred embodiments disclosed herein. For example, the foregoing disclosure uses explanatory terms, such as GNSS, GPS, RLM as well as distress beacon, MEOLUT, and the Cospas-Sarsat system, which should not be construed so as to limit the scope of protection of the claims, or to otherwise imply that the inventive aspects of the disclosed methods and devices are limited to the particular methods and apparatus disclosed. In Particular, though much of the present disclosure is related to a specific satellite system, named Cospas-Sarsat or MEOSAR or SAR/Galileo, and to a specific application of Search and Rescue (SAR), which are indeed relevant to the present invention, the present invention is definitely not limited to any specific system or any specific application. As a skilled person may appreciate, estimating the location of a beacon, according to the present invention, might be done via other satellite systems, such as Iridium, Inmarsat, Starlink, Oneweb, Kuiper, etc., and for different needs not necessarily SAR.

In many cases, the place of implementation described herein is merely a designer's preference and not a hard requirement. For example, functions disclosed as implemented at the base station may alternatively be partially implemented at satellite payloads, or vice versa. Also, functions or blocks described as implemented in hardware might be alternatively implemented in software, or vice versa. Given the rapidly declining cost of digital signal processing and other processing functions, it is easily possible, for example, to transfer the processing or a particular function from one of the functional elements described herein to another functional element without changing the inventive operation of the system.

The invention claimed is:

1. A method for estimating the current location of a remote radio beacon, at a mobile device, using at least two satellite relays and one base station, comprising the steps of:
   a. Configuring the radio beacon to periodically transmit RF signals;
   b. Configuring a first satellite payload to relay signals between beacon and base station;
   c. Configuring the base station to detect relayed beacon signals, and accordingly determine a first position (P1) at which the beacon was at a first time (T1), and a second position (P2) at which the beacon was at a second time (T2), and transmit information encoding P1, T1, P2 and T2;
   d. Configuring a second satellite payload to relay signals between base station and mobile device;
   e. Configuring the mobile device to detect relayed base station signals, decode P1, T1, P2, and T2, and determine the beacon position (Pc) at current time (Tc) based on P1, P2, T1, T2 and Tc, adjusting Tc according to the time reference at which T1 and T2 are expressed.

2. The method according to claim 1, wherein T1 and T2 are selected from a pre-defined set of discrete values.

3. The method according to claim 1, wherein at least one of: the information about P2 is encoded as the difference from P1 (Pd), or the information about T2 is encoded as the difference from T1 (Td).

4. The method according to claim 1, wherein at the base station, P1 is determined based on a multitude of signals arriving approximately at T1, and P2 is determined based on a multitude of signals arriving approximately at T2.

5. The method according to claim 1, wherein at the mobile device, Pc is determined on a line with P1 and P2, and the distance between Pc and P2 is set to: $(Pc-P2)=(P2-P1)*(Tc-T2)/(T2-T1)$.

6. The method according to claim 1, further configuring the base station to determine, encode and transmit an estimator of the error (Er) of P1 and P2.

7. The method according to claim 1, further configuring the mobile device to determine its self-position, and display the bearing and distance from its self-position to Pc.

8. The method according to claim 1, wherein said first payload and said second payload are same, or mounted onboard same satellite.

9. The method according to claim 1, wherein said second payload is a navigation payload, and the information about P1, T1, P2 and T2 is encoded in a downlink navigation message.

10. The method according to claim 1, wherein the information about P1, T1, P2 and T2 is encoded in a Galileo Return Link Message.

11. The method according to claim 1, wherein the mobile device is integrated with a radio beacon.

12. A mobile device for estimating the current location of a remote radio beacon, comprising: a) a receiver; b) a controller; and c) a display; said device configured to detect and decode data embedded in satellite downstream signals, indicating a first position (P1) at which the beacon was at a first time (T1), and a second position (P2) at which the beacon was at a second time (T2), further acquire the current time (Tc), then determine and display the current position of the beacon (Pc) based on P1, P2, T1, T2 and Tc, adjusting Tc according to the time reference at which T1 and T2 are expressed.

13. The device according to claim 12, configured to determine Pc on a line with P1 and P2, such that the distance between Pc and P2 is: $(Pc-P2)=(P2-P1)*(Tc-T2)/(T2-T1)$.

14. The device according to claim 12, further configured to determine its self-position, and display bearing and distance from its self-position to Pc.

15. The device according to claim 12, wherein the receiver is a GNSS receiver configured to decode P1, P2, T1 and T2 encoded in a GNSS navigation message.

16. The device according to claim 15, wherein the GNSS receiver is Galileo enabled, configured to decode P1, P2, T1 and T2 encoded in Galileo Return Link Messages (RLM).

17. The device according to claim 12, integrated with a radio beacon.

18. A computer non-transitory readable storage medium storing a program for a mobile device to estimate the current location of a remote radio beacon, the computer program comprising a set of instructions for causing the device to perform the steps of:
   a. Configuring a GNSS receiver to acquire and decode data transmitted in downstream GNSS signals, said data indicating a first position (P1) at which the beacon was at a first time (T1), and a second position (P2) at which the beacon was at a second time (T2);
   b. Acquiring the current time;
   c. Determining and displaying the beacon position (Pc) at current time (Tc) based on P1, P2, T1, T2 and Tc, adjusting Tc according to the time reference at which T1 and T2 are expressed.

19. The computer storage medium storing a program according to claim 18, causing the device to further determine Pc on a line with P1 and P2, such that the distance between Pc and P2 is: $(Pc-P2)=(P2-P1)*(Tc-T2)/(T2-T1)$.

20. The computer storage medium storing a program according to claim 18, causing the device to further acquire self-position, determine and display distance and bearing from self-position to Pc.

* * * * *